Patented Feb. 13, 1945

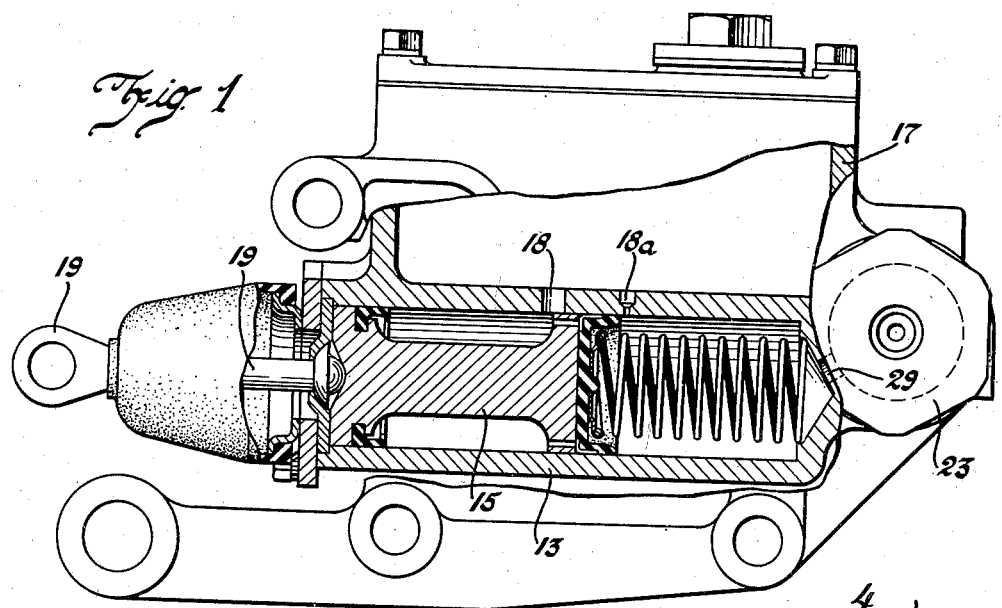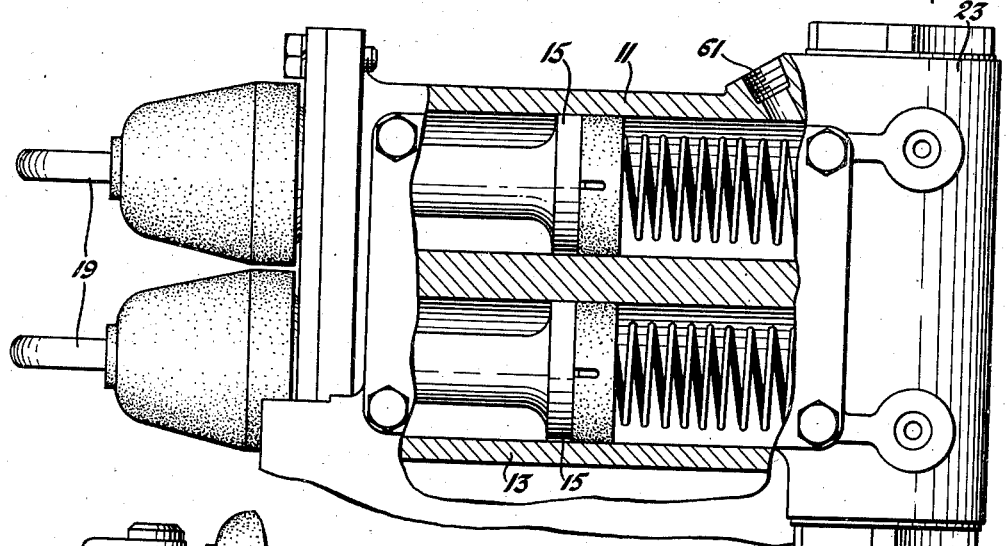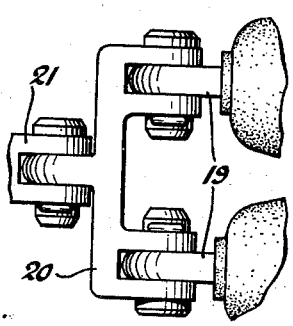

2,369,313

UNITED STATES PATENT OFFICE 2,369,313

HYDRAULIC BRAKE

Olaf Rasmussen, Dayton, Ohio, assignor to General Motors Corporation, Detroit, Mich., a corporation of Delaware Application April 13, 1942, Serial No. 438,761

7 Claims. (Cl. 60—54.5)

This invention relates to hydraulic applying mechanism and has been designed particularly for vehicle brakes. In particular it relates to an applying mechanism which includes two independent systems, one for one brake or set of brakes and the other for another brake or set of brakes, together with means to effect pressure equalization between said systems.

An object of the invention is to provide such a mechanism with an auxiliary cylinder having a floating piston which shall move in response to unbalanced fluid pressure in the two end spaces of said cylinder which spaces constitute parts of the two systems.

A further object is to provide springs in said auxiliary cylinder which springs shall resist the movement of the floating piston under the influence of unbalanced fluid pressure but which shall not supplement said unbalanced pressure.

Other objects and advantages will be understood from the description which follows:

On the drawings:

Figure 1 is a view in elevation partly in section.

Figure 2 is a horizontal section through the two master cylinders.

Figure 3 is a detail showing in plan a part of the operating means.

Figure 4:
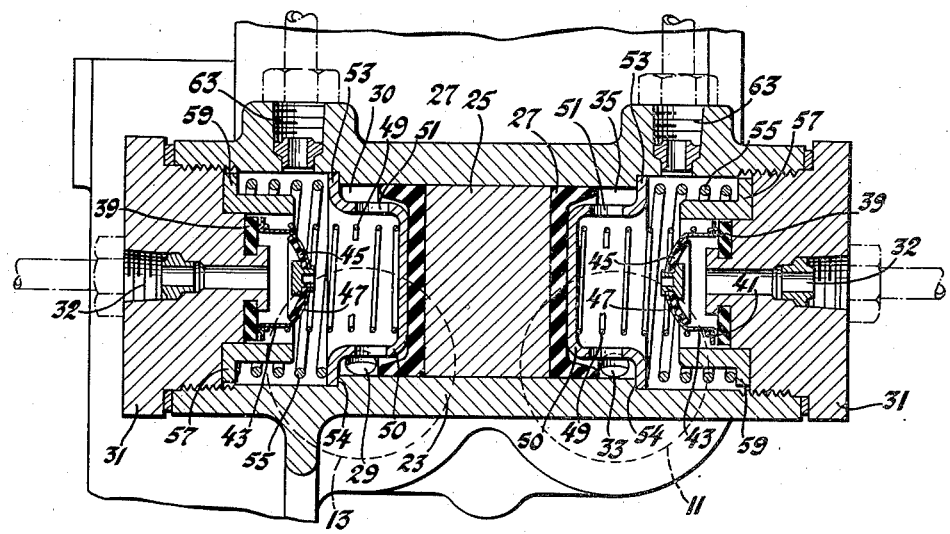
Figure 4 is a vertical section through the equalizing cylinder on line 4—4 of Figure 2.

Referring to the drawings, there may be seen parallel master cylinders 11 and 13. In each is a piston 15. At 17 is a substantially conventional reservoir, there being the usual communicating passages 18 and 18a between the reservoir and cylinders. The two pistons are to be jointly applied by rods 19 connected by a suitable crosshead 20 to a pedal 21. The casting within which the cylinders are formed also contains an auxiliary equalizing cylinder 23 having an axis at a right angle to the axes of parallel cylinders 11 and 13. Within cylinder 23 is a floating piston 25 having sealing means 27. From master cylinder 13 a passage 29 leads to a space 30 between piston 25 and the end cap 31 of the auxiliary cylinder. Numeral 33 marks a passage between cylinder 11 and space 35.

From spaces 30 and 35 lead outlet passages 32 in the two caps for affording communication with pipes leading in one case to front wheel brake cylinders, and in the other case to rear wheel brake cylinders. Around each cap opening is a seal 39 of rubber or the like engaged by a radial flange 41 of a cup shaped stamping 43 to the under side of the dome of which is secured a flexible closure member 45 adapted to prevent return flow of fluid into said spaces through openings 47 in the stamping. The stamping is biased to a position engaging its seal by a spring 49 engaging the flange 41 and in abutment with the bottom of a cup 50 located adjacent to or in contact with the piston seal 27. Under the influence of the brake return springs, not shown, the cup 43 is lifted from seal 39 against the lesser resistance of spring 49 and fluid flows into the cylinder end space from the conduit until the fluid pressure equals the opposing spring pressure. In this way the desired residual pressure is maintained in the conduit and wheel cylinders.

The cup 50 is shown to be provided with apertures 51 through which fluid may flow to reach the region adjacent the valve. The cup 50 has a radial flange 53 adapted to engage a shoulder 54 formed on the cylinder wall. It is biased to such engagement by a spring 55, the opposite end of which spring engages a radial flange 57 of an angular stop member 59. Flange 57 seats on the end cap as shown. The body of stop member 59 is adapted to be contacted by flange 53 of cup 50 to limit the endwise movement of said cup and of the piston 25.

In the normal operation, the fluid from the two master cylinders enters the end spaces of the auxiliary cylinder and under the influence of pressure originating in the master cylinders passes through the stampings by lifting the flexible closures 45 and flows toward the wheel cylinders to apply the brakes. In the event that pressure builds up in one of these end spaces more than in the other because of unequal shoe clearances, the unbalanced pressure will move the floating piston to restore the balance. In doing so, the piston is moved against the resistance of springs 49 and 55. The movement will not take place until the built-up fluid pressure is able to, of itself, overcome the opposing force of the springs for the reason that the piston is not held in balance between the springs of the two spaces. The springs function to hold the flanges 53 against the shoulder 54. These springs do not supplement the unbalanced fluid pressure in moving the piston. The action of the piston is therefore stable. In the event of excessive fluid pressure differences in the end spaces as where a break occurs in the conduit to one of the brakes, the cup flange 53 is stopped on the member 45 and the brakes operated by at least one of the two systems remain effective.

Figure 5:
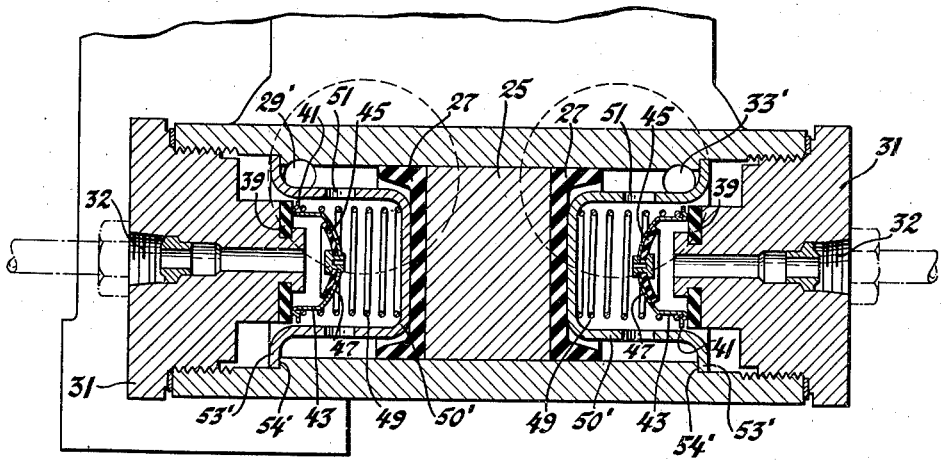
Figure 5 is a similar section through a modified form of equalizing cylinder.

While the construction above described may be referred to as a preferred embodiment, a somewhat modified form is shown in Fig. 5. It differs not in function but in that it uses but one spring to bias the outlet valve to closed position and to bias the cup flange into contact with the cylinder shoulder. In this form, passages 29' and 33' afford communication with the master cylinders 13 and 11. In the case of each end the seal 39 is engaged as before by the valve stamping 43 which carries the closure 45 over openings 47. A cup 50' replaces cup 50. It is similar, however, to cup 50. The inner face of the dome of the cup seats spring 49 and the cup has a flange 53' to engage a cylinder wall shoulder 54'. Also provision for stopping the movement of the piston is made. The flange 53' engages the cap 31 to serve this purpose.

It will be observed that Figure 2 shows an outlet 61 in a master cylinder and that Figure 4 shows other outlets 63 from the end spaces. These outlets are not a part of the invention. They may be used, as will be obvious, for a signal light switch and for the connection of conduits to gages to indicate differences of fluid pressure in the two systems.

I claim:

1. Hydraulic operating mechanism comprising two independent systems, each system including a conduit containing a variable volume space, movable means inversely to change the volume of said spaces in response to unbalanced fluid pressure therein, spring means to resist movement of said movable means and stop means whereby said spring means may not supplement said fluid pressure means in moving said movable means.

2. Hydraulic operating mechanism comprising a pair of master cylinders arranged in parallel relation, pistons therein, means to move said pistons jointly, an auxiliary cylinder, a piston floating therein and forming end spaces, means affording communication between said master cylinders and end spaces, outlet means from said end spaces, two-way check valves controlling said outlet means, and other and unrestricted outlets leading from said end spaces whereby instrumentalities served thereby may be subject to master cylinder pressure, springs in said end spaces adapted to resist movement of said floating piston in either direction, and stop means whereby said springs may not supplement the unbalanced fluid pressure in moving said floating piston.

3. In hydraulic applying mechanism, a pair of master cylinders, pistons therein, means jointly to move said pistons, an equalizing cylinder, a piston floating therein and forming end spaces, passage means between said master cylinders and spaces, shoulders in said spaces, a member in each space adapted to be engaged by the floating piston and having a flange adapted to engage said shoulder to limit its inward movement and a spring operable to bias said member into a position where the flange contacts the shoulder and thereby limits the movement of the piston in response to the spring.

4. The invention defined by claim 3, together with a stop member adjacent the outer end of each space, said stop member constituting an abutment for said spring and, by contact with said member, limiting the outward movement of said member and floating piston.

5. The invention defined by claim 3, each said member being of cup shape, the base of the cup being normally adjacent said floating piston and its flange being normally in contact with said shoulder.

6. The invention defined by claim 3, together with two way valve means controlling the outlets from each space, said valve means having a flange and a second spring terminally engaging said flange and said member.

7. The invention defined by claim 3, said shoulders being formed in the cylinder wall, together with two-way valve means controlling the outlets from said spaces, each valve means having a flange and second springs positioned between said flanges and the walls of the members remote from the faces engaged by the floating piston.

OLAF RASMUSSEN.